(12) United States Patent
Hossain et al.

(10) Patent No.: US 8,440,357 B2
(45) Date of Patent: May 14, 2013

(54) FUEL CELL CATALYST REGENERATION

(75) Inventors: Tim Z. Hossain, Austin, TX (US);
Daniel E. Posey, Granite Shoals, TX (US)

(73) Assignee: Spansion LLC, Sunnyvale, CA (US)

(*) Notice: Subject to any disclaimer, the term of this patent is extended or adjusted under 35 U.S.C. 154(b) by 0 days.

(21) Appl. No.: 13/156,768

(22) Filed: Jun. 9, 2011

(65) Prior Publication Data
US 2011/0236773 A1 Sep. 29, 2011

Related U.S. Application Data

(62) Division of application No. 12/056,562, filed on Mar. 27, 2008, now Pat. No. 7,981,825.

(51) Int. Cl.
| H01M 8/06 | (2006.01) |
| H01M 8/10 | (2006.01) |
| H01M 6/50 | (2006.01) |
| B01J 38/04 | (2006.01) |
| B01J 38/10 | (2006.01) |
| B01J 38/08 | (2006.01) |

(52) U.S. Cl.
USPC .......... 429/408; 429/480; 429/49; 502/34; 502/53; 502/54; 502/514

(58) Field of Classification Search .......... 502/20, 502/34, 53, 54, 514; 429/408, 479, 480, 429/527, 49
See application file for complete search history.

(56) References Cited

U.S. PATENT DOCUMENTS

| 4,781,995 | A | * | 11/1988 | Giner | 429/415 |
| 5,658,843 | A | | 8/1997 | Tsukada et al. | |
| 5,783,324 | A | * | 7/1998 | Binder et al. | 429/492 |
| 7,078,130 | B2 | | 7/2006 | Antonelli | |
| 7,622,412 | B2 | | 11/2009 | Hill et al. | |
| 2003/0178343 | A1 | * | 9/2003 | Chen et al. | 208/213 |
| 2004/0205032 | A1 | * | 10/2004 | Routtenberg et al. | 705/400 |
| 2005/0032626 | A1 | | 2/2005 | Song et al. | |
| 2006/0035784 | A1 | * | 2/2006 | Wessel et al. | 502/342 |

OTHER PUBLICATIONS

U.S. Office Action dated Sep. 27, 2010 corresponding to U.S. Appl. No. 12/056,562, filed Mar. 27, 2008.

* cited by examiner

*Primary Examiner* — Kaj K Olsen
*Assistant Examiner* — Noah Wiese
(74) *Attorney, Agent, or Firm* — Turocy & Watson, LLP

(57) ABSTRACT

Systems that facilitate operating proton exchange membrane (PEM) fuel cells are provided. The systems employ a fuel supply component that supplies fuel to the proton exchange membrane fuel cell; and a regeneration component that provides a reducing agent comprising a mixture of hydrogen and nitrogen, or a reducing plasma to a cathode catalyst of the proton exchange membrane fuel cell to reduce the cathode catalyst.

20 Claims, 3 Drawing Sheets

FUEL CELL CATALYST REGENERATION

CROSS-REFERENCE TO RELATED APPLICATION

This application is a Division of U.S. patent application Ser. No. 12/056,562 filed Mar. 27, 2008, the entirety of which is incorporated herein by reference.

TECHNICAL FIELD

The subject innovation generally relates to systems and methods that facilitate operating proton exchange membrane (PEM) fuel cells.

BACKGROUND

PEM fuel cells, also known as polymer electrolyte membrane fuel cells (PEMFC), are a type of fuel cell being developed for transport applications as well as for stationary and portable applications. Their distinguishing features include lower temperature/pressure ranges and a special polymer electrolyte membrane. A PEM fuel cell transforms the chemical energy liberated during the electrochemical reaction of hydrogen and oxygen to electrical energy, as opposed to the direct combustion of hydrogen and oxygen gases to produce thermal energy.

A stream of hydrogen is delivered to an anode side of the PEM fuel cell. At the anode side it is catalytically split into protons and electrons. This oxidation half-fuel cell reaction is represented by:

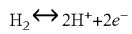
$$H_2 \leftrightarrow 2H^+ + 2e^-$$

The newly formed protons permeate through the polymer electrolyte membrane to the cathode side. The electrons travel along an external load circuit to the cathode side of the PEM fuel cell, thus creating the current output of the fuel cell.

Meanwhile, a stream of oxygen is delivered to a cathode side of the PEM. At the cathode side oxygen molecules react with the protons permeating through the polymer electrolyte membrane and the electrons arriving through the external circuit to form water molecules. This reduction half-fuel cell reaction is represented by:

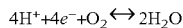
$$4H^+ + 4e^- + O_2 \leftrightarrow 2H_2O$$

A PEM fuel cell is an energy conversion device that combines a fuel (e.g., hydrogen) and air to directly produce electrical power. PEM Fuel cells can offer high efficiency and low emissions when compared to conventional technologies. Unlike internal combustion generators, fuel cells convert chemical energy directly into electricity without an intermediate conversion into mechanical power. If pure hydrogen is used as a fuel, the only products of this process are heat, electricity, and water.

SUMMARY

The following presents a simplified summary of the innovation in order to provide a basic understanding of some aspects of the innovation. This summary is not an extensive overview of the innovation. It is intended to neither identify key or critical elements of the innovation nor delineate the scope of the innovation. Its sole purpose is to present some concepts of the innovation in a simplified form as a prelude to the more detailed description that is presented later.

One aspect of the subject innovation described herein provides methods of regenerating a PEM fuel cell. The methods can involve contacting a reducing agent comprising a mixture of hydrogen and nitrogen, or a reducing plasma with a cathode catalyst of a PEM fuel cell to reduce the cathode catalyst. In another embodiment, the methods can involve providing a reducing agent comprising a mixture of hydrogen and nitrogen, or a reducing plasma to a cathode catalyst of a PEM fuel cell; and contacting the reducing agent with the cathode catalyst to reduce the cathode catalyst. By regenerating the metal catalyst, a fuel cell membrane can be used for longer time and range and a fuel cell can last and produce energy for longer period of time.

In accordance with another aspect of the subject innovation, a system that facilitates operating a PEM fuel cell is provided. The system employs a fuel supply component that supplies fuel to a PEM fuel cell; and a regeneration component that provides a reducing agent comprising a mixture of hydrogen and nitrogen, or a reducing plasma to a cathode catalyst of the PEM fuel cell to reduce the cathode catalyst. In accordance with yet another aspect of the subject innovation, a hydrogen station including the system is provided.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
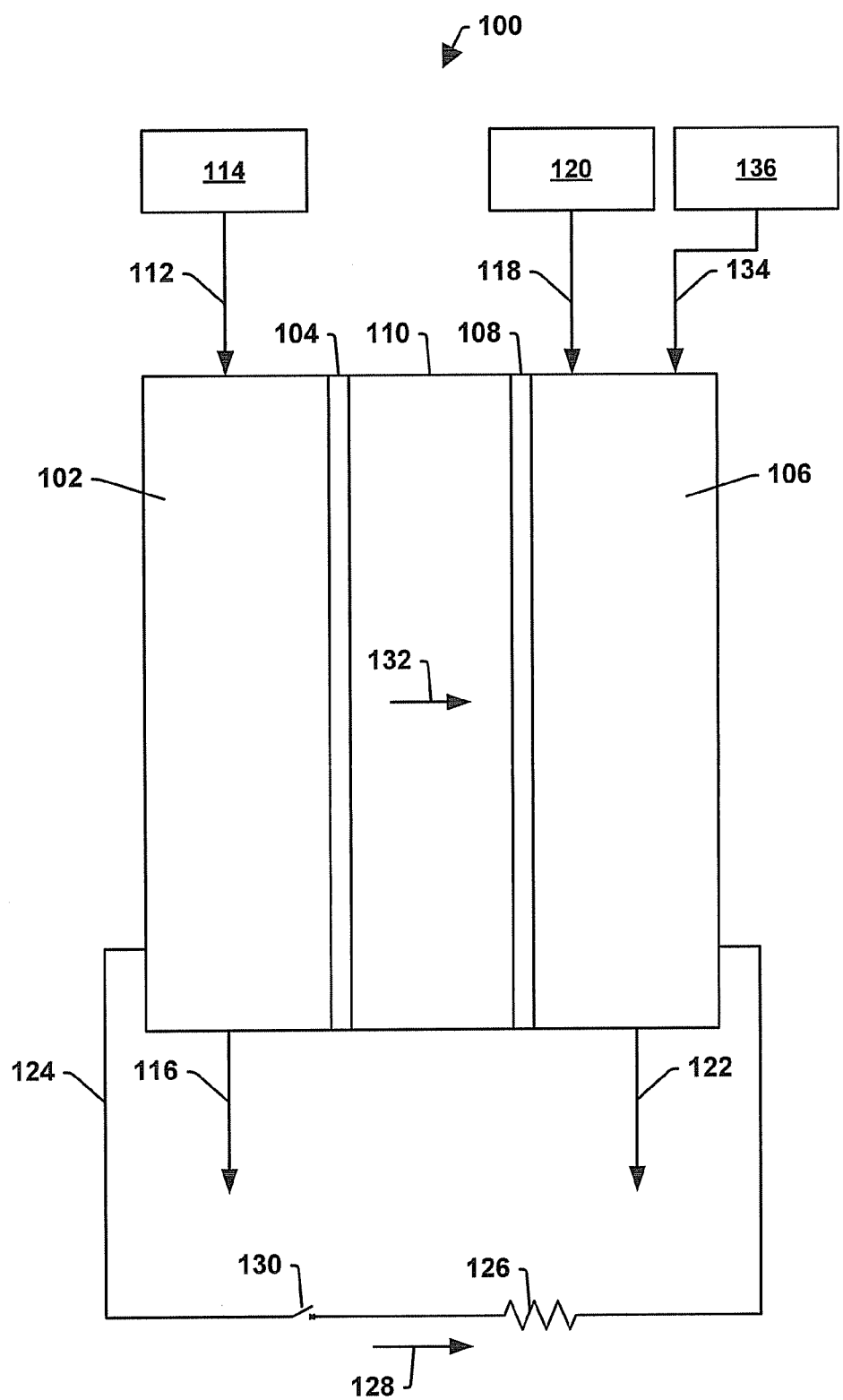
FIG. 1 is a schematic illustration of a PEM fuel cell that can be regenerated in accordance with one aspect of the specification.

PEM fuel cells may experience performance losses or decay during the course of their operation. Performance loss can be degradation in the voltage of fuel cells at a certain current density or, conversely, a degradation of current density at a certain voltage. Such performance losses may be the result of a variety of factors, including operating environment, component design, operating and maintenance procedures, and the kinds of materials used. High performance levels and easy means for attaining and retaining PEM fuel cells can be achieved by the subject innovation without detriment to fuel cell life, low cost and ease of maintenance, all of which can be critical for commercial success.

The subject innovation described herein provides systems and methods that facilitate operating PEM fuel cells and/or regenerating PEM fuel cells. Metals such as platinum (Pt) are typically used as a catalyst in a membrane of a PEM fuel cell. The catalyst may get oxidized and/or from carbonyl compounds during the course of the fuel cell operation, and thus lose a catalytic activity. In particular, metal catalysts on a cathode side may easily lose their catalyst activities.

In the subject regenerating systems and methods, oxides of metal catalysts and/or carbonyls of metal catalysts of PEM fuel cells can be reduced and/or converted back to the metallic state (e.g., zero valence state), thereby restoring the original catalytic activities of the metal catalysts. The regeneration process can be carried out in a reduced environment. By regenerating the metal catalyst, a fuel cell membrane can be used for longer time and range. A fuel cell can last and produce energy for longer period of time.

The subject innovation regenerates a PEM fuel cell, which degrades in performance during normal operation, by reducing a cathode metal catalyst of the fuel cell. The subject innovation can be applicable to fuel cells using pressurized and unpressurized reactants.

In the specification and claims the phrase "normal operation" means that a PEM fuel cell is operating to provide an electric current within an external electric circuit to power an electricity using device at a cathode potential of, for example, at least 0.66 volt with a hydrogen containing fuel on the anode and an oxidant on the cathode. Cathode potential equals fuel cell voltage, plus anode potential, plus the product of fuel cell current and PEM resistance. Thus, cathode potential is usually slightly higher than fuel cell voltage.

The more frequent the periodic regeneration (e.g., the less the amount of time the fuel cell operates under normal operating conditions between successive regenerations), the higher will be the average performance level of the fuel cell over the course of normal operation. The frequency of regeneration can depend upon the construction and operation of the fuel cell, as well as its application. In one embodiment, hourly or daily regeneration is desirable. In another embodiment, it is suitable to regenerate a fuel cell weekly or upon the occurrence of some event (such as during routine maintenance), or whenever performance of the fuel cell under normal operating conditions falls below a pre-determined level. In yet another embodiment, regeneration can automatically or manually be performed when a fuel cell is started for normal operation or the fuel cell is refilled with fuel (e.g., hydrogen). For example, in an automotive application regeneration can automatically or manually be performed when the car is started or the car is refilled with fuel.

The fuel cell performance losses can be the result of cathode metal catalyst being converted to metal oxides and/or metal carbonyls during normal cell operation. The metal oxides and/or metal carbonyls do not have as high a catalytic activity for oxygen reduction as does the metallic state. Due to the conversion of the metal catalysts, there is a drop in fuel cell performance over time. The oxidation of metals to metal oxides and/or metal carbonyls can occur slowly during producing electric current by the fuel cell, building to undesirable levels over the course of, for example, hundreds of hours of the fuel cell operation.

The conversion of the metal oxides and/or metal carbonyls back to metal state using the subject innovation can occur at a much faster rate than the build up of metal oxides and/or metal carbonyls. The conversion can occur by contacting a reducing agent with the metal oxides and/or metal carbonyls. In one embodiment, a reducing agent can be provided to a cathode and/or an anode of a fuel cell after the flow of oxidant to the fuel cell is stopped and an electric load is disconnected. The reducing agent is contacted with a metal catalyst of the cathode and/or a metal catalyst of the anode of the fuel cell and the contact can result in reducing a cathode potential and/or an anode potential. Once the desired low potential of the cathode and/or anode is reached, the low potential can be maintained at or below that low voltage for a sufficient period of time, thereby recovering a major portion of or all the performance it lost while operating normally.

In another embodiment, a reducing agent is introduced into an anode and an inert gas is introduced into a cathode. The reducing agent can diffuse across the PEM from the anode to the cathode and cause reduction of the cathode. Once the cathode potential falls to a pre-determined value, the fuel cell can be maintained at or below the pre-determined value for a sufficient period of time, thereby recovering a major portion of or all the performance it lost while operating normally. The fuel cell can retain high level of performance over an extended period of time.

In yet another embodiment, the method of regenerating a fuel cell involves disconnecting the fuel cell from its normal operating load; stopping a flow of hydrogen to an anode; stopping a flow of oxidant to a cathode; contacting the cathode with a reducing agent. In still yet another embodiment, after a period of normal cell operation the electric load is removed from the fuel cell and both the anode and cathode are supplied with a flow of a reducing agent.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

FIG. 1 illustrates an exemplary method of regenerating a PEM fuel cell. A PEM fuel cell system 100 includes an anode 102 containing an anode catalyst layer 104, a cathode 106 containing a cathode catalyst layer 108, and a PEM electrolyte 110 between the anode 104 and cathode 106. The combination of the anode catalyst layer 104, the PEM electrolyte 110, and the cathode catalyst layer 108 may be referred to as a membrane electrode assembly (MEA). Although a single fuel cell is shown in FIG. 1, a fuel cell system can include two or more adjacent fuel cells connected electrically in series. For purposes of simplicity, other parts of the fuel cell or a stack of fuel cells, such as coolant layers, reactant flow channels, or other features of the anode and cathode for carrying fuel and oxidant to the catalyst layers and for allowing the proper movement of water throughout the fuel cell are not shown.

When operating the fuel cell (e.g., generating electricity), fuel, such as hydrogen, is provided to the anode 102 via the conduit 112 from a first source 114. Depleted fuel can leave the anode 102 via the conduit 116. An oxidant, such as air, can be provided to the cathode 106 via a conduit 118 from a second source 120 and leaves the anode via a conduit 122. The fuel electrochemically reacts during the normal operation (e.g., electrical energy generating process) to produce protons (e.g., hydrogen ions) and electrons. The electrons flow from the anode 102 to the cathode 106 through an external circuit 124 to power an electricity-using device represented by the load or resistance 126. The arrow 128 shows the direction of electron flow. The external circuit 124 connecting the anode 102 and cathode 106 can include a switch 130 that is disposed in series with the electric load 126.

The electrons react with the oxidant and the protons at the cathode 106 to form water and heat. The hydrogen ions travel through the PEM 110 from the anode 102 to the cathode 106, dragging with them water molecules in the form of hydronium ions. The arrow 132 represents the flow of hydrogen and hydronium ions from the anode 102 to the cathode 106.

When a fuel cell 100 is efficiently generating electricity for an electricity-using device 126, the voltmeter (not shown), connected across the fuel cell, typically indicates a high fuel cell voltage. In one embodiment, a fuel cell is designed to generate electricity at a fuel cell voltage of about 0.6 volt or more. In another embodiment, a fuel cell is designed to generate electricity at a fuel cell voltage of about 0.7 volt or more. In yet another embodiment, a fuel cell is designed to generate electricity at a fuel cell voltage of about 0.8 volt or more. In one embodiment, when the fuel cell voltage is lower than about 0.6 volt, the fuel cell is considered inefficient and subjected to a regeneration process.

The regeneration can be accomplished by a method for periodically regenerating the fuel cell 100 frequently enough to avoid having the fuel cell operate at undesirably low performance levels for an extended period of time. The method can involve contacting a cathode with a reducing agent. The reducing agent can be provided to the cathode 106 through a conduit 134 that connects a third source 136 and the cathode 106. Although not shown in FIG. 1, when the reducing agent contains hydrogen, the hydrogen can be provided from a first source 114 and a conduit can connect the first source 114 and the cathode 106.

The fuel cell system can include controls (not shown) for controlling and monitoring the system, such as for controlling the rates of reactant flow as determined by, for example, the requirements of the load and/or for operating the switch either upon demand, in accordance with a schedule, or, for example, when certain measured parameters reach pre-determined values.

In one embodiment, after a suitable period of generation of electricity, the fuel cell 100 is subjected to the regeneration process. In the regeneration process, a flow of hydrogen to the anode 102 and a flow of oxidant to the cathode 106 can be stopped, and the electricity-using device 124 is disconnected by opening the switch 130. A reducing agent can be provided to the cathode 106 through the conduit 134 and is contacted with the cathode catalyst 108. The reducing agent converts oxides and/or carbonyls of metal catalyst of cathode catalyst layer 108 back to metallic state.

Reducing agents can include a mixture of hydrogen and nitrogen, or a reducing plasma. The mixture can contain any suitable amount of hydrogen to reduce substantially all of metal components of cathode catalyst layer to the corresponding elemental metallic state. In one embodiment, the mixture contains about 5 wt. % of hydrogen or more and about 95 wt. % of hydrogen or less and about 5 wt. % of nitrogen or more and about 95 wt. % of nitrogen or less. In another embodiment, the mixture contains about 10 wt. % of hydrogen or more and about 90 wt. % of hydrogen or less and about 10 wt. % of nitrogen or more and about 90 wt. % of nitrogen or less. In yet another embodiment, the mixture contains about 20 wt. % of hydrogen or more and about 80 wt. % of hydrogen or less and about 20 wt. % of nitrogen or more and about 80 wt. % of nitrogen or less. In still yet another embodiment, the mixture contains about 30 wt. % of hydrogen or more and about 70 wt. % of hydrogen or less and about 30 wt. % of nitrogen or more and about 70 wt. % of nitrogen or less.

The subject innovation can employ a reducing plasma as a reducing agent. Any suitable reducing plasma can be employed as long as the reducing plasma can reduce substantially all of metal components of cathode catalyst layer to the corresponding elemental metallic state. Examples of reducing plasma include a hydrogen containing plasma, a helium containing plasma, a neon containing plasma, an argon containing plasma, a nitrogen containing plasma, or combinations thereof. In another embodiment, the reducing plasma contains a reducing gas species including ammonia, amines, imines, C1-C4 hydrocarbons, such as methane or ethane, or combinations thereof. The reducing plasma can include inert gas species such as helium, nitrogen, argon, neon, xenon, krypton, or combinations thereof. The reducing plasma can further include hydrogen.

The reducing agent can be contacted with the cathode catalyst 108 to regenerate the fuel cell 100 under any suitable condition (e.g., period of time, temperature, and pressure). In one embodiment, a reducing agent is contacted with a cathode catalyst layer at a temperature of about −30 degrees Celsius or more and about 80 degrees Celsius or less. In another embodiment, a reducing agent is contacted with a cathode catalyst layer at a temperature of about −10 degrees Celsius or more and about 70 degrees Celsius or less. In yet another embodiment, a reducing agent is contacted with a cathode catalyst layer at a temperature of about 10 degrees Celsius or more and about 60 degrees Celsius or less.

The reducing agent can be contacted the cathode metal catalyst at any suitable period of time for reducing the oxides and/or carbonyls of the metal. In one embodiment, a reducing agent is contacted with a cathode metal catalyst for about 1 second or more and about 1 hour or less. In another embodiment, a reducing agent is contacted with a cathode metal catalyst for about 5 seconds or more and about 30 minutes or less. In one embodiment, a reducing agent is contacted with a cathode metal catalyst for about 10 seconds or more and about 20 minutes or less.

The reducing agent can be contacted with a cathode catalyst at any suitable pressure for reducing the cathode catalyst. In one embodiment, when using a mixture of hydrogen and nitrogen as a reducing agent, the reducing agent is contacted with the cathode metal catalyst at or near atmospheric pressure. In another embodiment, the mixture is contacted with the cathode metal catalyst at a low pressure. When using a reducing plasma as a reducing agent, the reducing agent is contacted with the cathode metal catalyst at a pressure of about 1 torr or more and about 500 torr or less. In another embodiment, the reducing plasma agent is contacted with the cathode metal catalyst at a pressure of about 5 torr or more and about 400 torr or less. In yet another embodiment, the reducing plasma agent is contacted with the cathode metal catalyst at a pressure of about 10 torr or more and about 300 torr or less.

The reducing agent can be contacted with the cathode catalyst in a substantially water-free environment and/or in a substantially hydrocarbon-free environment to mitigate deactivation of the catalyst. In one embodiment, the reducing agent is contacted with the cathode metal catalyst in an environment containing less than about 50 volume ppm water and/or hydrocarbon. In another embodiment, the reducing agent is contacted with the cathode metal catalyst in an environment containing less than about 40 volume ppm water and/or hydrocarbon. In yet another embodiment, the reducing agent is contacted with the cathode metal catalyst in an environment containing less than about 30 volume ppm water and/or hydrocarbon.

In one embodiment, the reducing agent contains less than about 50 volume ppm water and/or hydrocarbon. In another embodiment, the reducing agent contains less than about 40 volume ppm water and/or hydrocarbon. In yet another embodiment, the reducing agent contains less than about 30 volume ppm water and/or hydrocarbon.

After the regeneration process the fuel cell 100 can be returned to its normal operating mode with oxidant being provided to the cathode 106. The fuel cell performance measured immediately after the regeneration process is higher than fuel cell performance measured immediately preceding the regeneration process. The performance loss experienced by the fuel cell 100 as a result of electrical energy generating process can be recovered by reducing the cathode potential to a pre-determined value (e.g., about 0.6 volt or less), and then operating the fuel cell for a sufficient period of time at or below that low cathode potential.

Periodic regeneration at suitable intervals can mitigate the performance of a fuel cell from dropping below a pre-determined value. The periodic regeneration can be conduced by scheduling the regeneration process to occur at sufficiently close intervals. In another embodiment, the performance of the fuel cell can be monitored, and regeneration triggered shortly after the fuel cell performance falls to a pre-determined value during normal operation.

In one embodiment, a fuel cell includes a membrane electrode assembly containing a mil thick perfluorosulfonic ionomer membrane having platinum containing anode catalyst disposed on one side thereof and a platinum containing cathode catalyst disposed on the other side thereof. In another embodiment, an anode contains a platinum-ruthenium alloy catalyst loading of about 0.2 $mg/cm^2$ or more and about 1 $mg/cm^2$ or less, and the cathode contains a platinum catalyst loading of about 0.2 $mg/cm^2$ or more and about 1 $mg/cm^2$ or less. Specific examples of fuel cell systems include an assembly of product name PRIMEA® from W. L. Gore & Associates, Inc that includes 40 fuel cells. Specific examples of such fuel cell system can be found in, for example, U.S. Pat. Nos. 6,610,436, which is issued Aug. 26, 2003, 6,300,000, which is issued Oct. 9, 2001, and 6,287,717, which is issued Sep. 11, 2001, which are hereby incorporated by reference.

Figure 2:
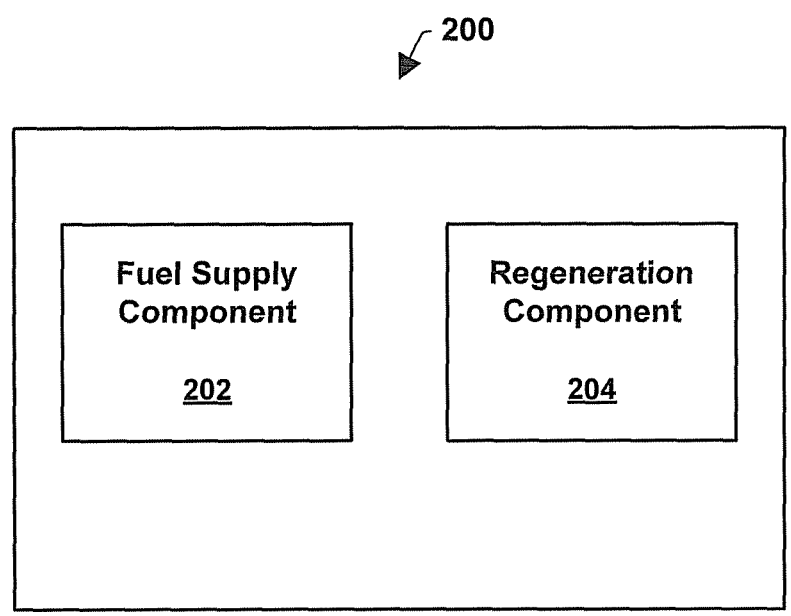
FIG. 2 is a schematic illustration of a system that facilitates operating a PEM fuel cell in accordance with one aspect of the specification.

FIG. 2 illustrates a system 200 that facilitates operating fuel cells. The system 200 can include a fuel supply component 202 and a regeneration component 204. The fuel supply component 202 can provide fuel to a PEM fuel cell (not shown). For example, the fuel supply component 202 is a fuel tank that can store hydrogen and feed hydrogen to a fuel cell. The regeneration component 204 can provide a reducing agent containing a mixture of hydrogen and nitrogen, or a reducing plasma to a cathode catalyst of a fuel cell to reduce the cathode catalyst.

In one embodiment, the regeneration component 204 provides the mixture containing about 5 wt. % of hydrogen or more and about 95 wt. % of hydrogen or less and about 5 wt. % of nitrogen or more and about 95 wt. % of nitrogen or less. In another embodiment, the regeneration component 204 is a plasma generator. The regeneration component 204 can provide a hydrogen containing plasma, a helium containing plasma, a neon containing plasma, an argon containing plasma, a nitrogen containing plasma, or combinations thereof. In another embodiment, the regeneration component 204 provides a reducing plasma containing at least one reducing gas species selected from a group consisting of ammonia, amines, imines, and C1-C4 hydrocarbons. The reducing plasma can contain hydrogen.

The system 200 can supply fuel to any suitable vehicle and/or machinery that include a PEM fuel cell. For example, the system 200 supplies fuel to a hydrogen vehicle, hydrogen machinery, or the like. The hydrogen vehicle/machinery can be a vehicle/machinery that uses hydrogen as its on-board fuel for motive power. Examples of hydrogen vehicles/machineries include a personal transportation vehicle, such as an automobile, or any other vehicle/machinery that use hydrogen in a similar fashion, such as aircrafts, farm tractors, portable machinery including generators, snow-blowers, lawn mowers, small watercraft engines, and the like, construction vehicles and machinery such as diggers, front end loaders, trucks, cranes, fork lifts, pavers, graders, bulldozers and the like, boats, ships, helicopters, trains, motorbikes, motorcycles, all-terrain vehicles, and related transportation machineries. The hydrogen machinery can include stationary machineries. A fuel cell of such vehicles/machineries converts the chemical energy of hydrogen to mechanical energy (torque) in electrochemical conversion. In the fuel-fuel cell conversion, the hydrogen is reacted with oxygen to produce water and electricity, the latter of which is used to power an electric traction motor.

The regeneration component 204 can regenerate a cathode catalyst in a fuel cell of above-mentioned vehicles and machineries. In one embodiment, the regeneration component 204 provides a mixture of hydrogen and nitrogen as a reducing agent for reducing a cathode catalyst. The hydrogen can be provided from the supply component 202 when the supply component 202 includes hydrogen. The fuel supply component can be connected with the regeneration component to provide hydrogen to the regeneration component.

In another embodiment, the regeneration component 204 provides a reducing plasma as a reducing agent for reducing a cathode catalyst. The regeneration component 204 can include a plasma generator. The regeneration component 204 can include any suitable plasma generator as long as the plasma generator can provide a reducing plasma that reduces substantially all of metal components of cathode catalyst layer to the corresponding elemental metallic state. The details of the structure and manufacture of plasma generators are not critical to the subject innovation. The details of the structure and manufacture of plasma generator can be found in, for example, U.S. Pat. Nos. 5,637,180, issued Jun. 10, 1997, 6,764,658, issued Jul. 20, 2004, and 6,917,165, issued Jul. 12, 2005, which are hereby incorporated by reference.

In one embodiment, the system 200 further includes a measuring device (not shown) for measuring the quantity of hydrogen in the supply component 202. The measuring device determines the quantity of hydrogen in the supply component based on a pressure and a temperature of the hydrogen in the component (e.g., tank).

The system can be a portion of a hydrogen station (e.g., hydrogen filling station, hydrogen home station, hydrogen highway). A hydrogen station can be a storage or filling station for hydrogen. The hydrogen station can be located along a road or highway, or at home or factory as part of the distributed generation resources concept. A hydrogen home station can include a solar powered water electrolyzing device. The solar powered water electrolyzing device can contain solar cells, power converter, water purifier, electrolyzer, piping, hydrogen purifier, oxygen purifier, compressor, pressure vessels, and a hydrogen outlet. A hydrogen highway is a chain of hydrogen-equipped filling stations and other infrastructure along a road or highway.

Figure 3:
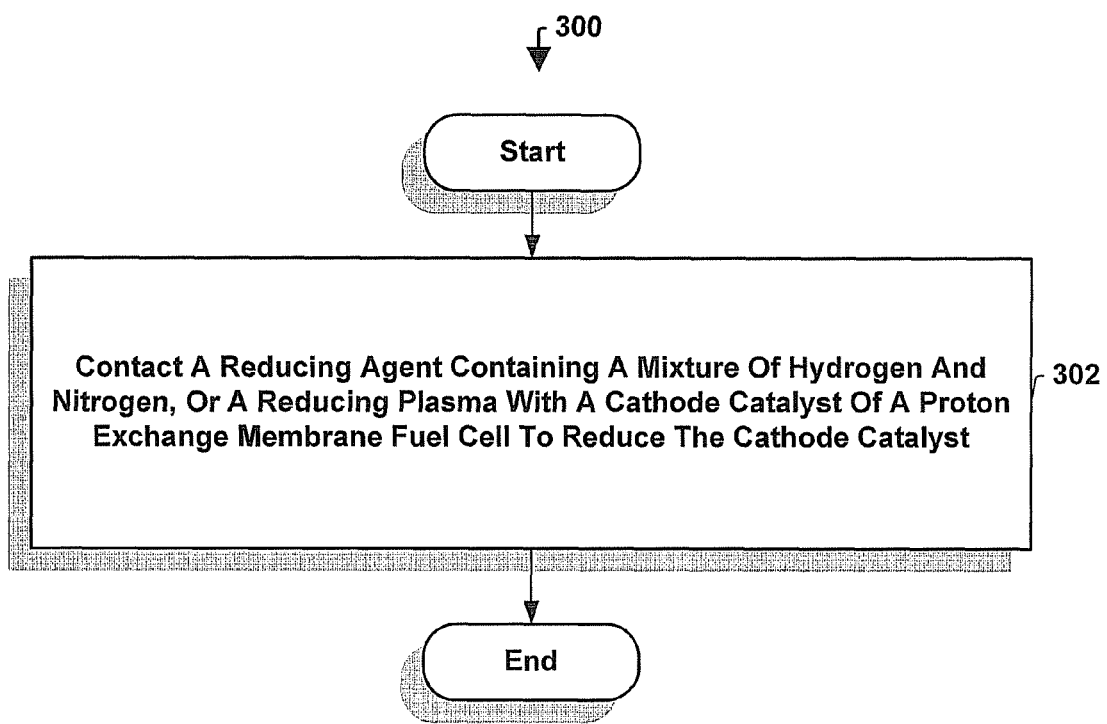
FIG. 3 is a flow diagram of an exemplary methodology for regenerating a PEM fuel cell.

FIG. 3 illustrates an exemplary methodology of regenerating a PEM fuel cell. At 302, a reducing agent containing a mixture of hydrogen and nitrogen, or a reducing plasma is contacted with a cathode catalyst of the proton exchange membrane fuel cell to reduce the cathode catalyst. In one embodiment, the method can involve providing a reducing agent containing a mixture of hydrogen and nitrogen, or a reducing plasma to a cathode catalyst of the proton exchange membrane fuel cell; and contacting the reducing agent with the cathode catalyst to reduce the cathode catalyst.

Although not shown in FIG. 3, in one embodiment, the mixture of hydrogen and nitrogen contains about 5 wt. % of hydrogen or more and about 95 wt. % of hydrogen or less and about 5 wt. % of nitrogen or more and about 95 wt. % of nitrogen or less. The reducing plasma can contain a hydrogen containing plasma, a helium containing plasma, a neon containing plasma, an argon containing plasma, a nitrogen containing plasma, or combinations thereof. In another embodiment, the reducing plasma contains at least one reducing gas species selected from a group consisting of ammonia, amines, imines, and C1-C4 hydrocarbons. In yet another embodiment, the reducing agent containing the reducing plasma further contains hydrogen. The reducing agent can be contacted with the cathode catalyst at a temperature of about −30 degrees Celsius or more and about 80 degrees Celsius or less and for about 1 second or more and about 1 hour or less.

The systems and methods described herein can be used with any suitable PEM fuel cell application. General examples of PEM fuel cell applications include poi/able/battery substitution, transportation, and distributed power. Specific examples of PEM fuel cell applications include portable/battery substitution (e.g., portable appliances and power tools, small personal vehicles, consumer electronics (laptops, fuel cell phones), roadway and traffic signage, backup power), transportation (e.g., automotive, public transportation, commercial transportation (truck, tractors), marine, military), and distributed power (e.g., homes and small businesses, commercial and industrial sites, remote, off-grid locations (telecom towers, weather stations)).

What has been described above includes examples of the disclosed information. It is, of course, not possible to describe every conceivable combination of components or methodologies for purposes of describing the disclosed information, but one of ordinary skill in the art can recognize that many further combinations and permutations of the disclosed information are possible. Accordingly, the disclosed information is intended to embrace all such alterations, modifications and variations that fall within the spirit and scope of the appended claims. Furthermore, to the extent that the term "includes," "has," "involve," or variants thereof is used in either the detailed description or the claims, such term is intended to be inclusive in a manner similar to the term "comprising" as "comprising" is interpreted when employed as a transitional word in a claim.

What is claimed is:

1. A system that facilitates operating a proton exchange membrane fuel cell, comprising:
    a fuel supply component that supplies fuel to the proton exchange membrane fuel cell; and
    a regeneration component that provides a reducing agent comprising a mixture of hydrogen and nitrogen, or a reducing plasma to a cathode catalyst of the proton exchange membrane fuel cell to reduce the cathode catalyst, wherein the regeneration component is a plasma generator.

2. The system of claim 1, wherein the mixture of hydrogen and nitrogen comprises about 5 wt. % of hydrogen or more and about 95 wt. % of hydrogen or less and about 5 wt. % of nitrogen or more and about 95 wt. % of nitrogen or less.

3. The system of claim 1, wherein the mixture of hydrogen and nitrogen comprises about 20 wt. % of hydrogen or more and about 80 wt. % of hydrogen or less and about 20 wt. % of nitrogen or more and about 80 wt. % of nitrogen or less.

4. The system of claim 1, wherein the regeneration component is an argon plasma generator.

5. The system of claim 1, wherein the reducing agent comprises at least one reducing gas species selected from a group consisting of a hydrogen containing plasma, a helium containing plasma, a neon containing plasma, an argon containing plasma, a nitrogen containing plasma, ammonia, amines, imines, and C1-C4 hydrocarbons.

6. The system of claim 1, wherein the reducing agent comprises less than about 50 volume ppm water and/or hydrocarbon.

7. The system of claim 1, wherein the fuel supply component is connected with the regeneration component to facilitate contact between hydrogen and the regeneration component.

8. A hydrogen station comprising the system of claim 1.

9. The hydrogen station of claim 8, wherein the hydrogen station is a hydrogen filling station.

10. A system that facilitates operating a proton exchange membrane fuel cell, comprising:
    a fuel supply component that supplies fuel to the proton exchange membrane fuel cell; and
    a regeneration component comprising a plasma generator that provides a reducing agent comprising a reducing plasma to a cathode catalyst of the proton exchange membrane fuel cell to reduce the cathode catalyst.

11. The system of claim 10, wherein the plasma generator is an argon plasma generator.

12. The system of claim 10, wherein the plasma generator is a hydrogen plasma generator.

13. The system of claim 10, wherein the reducing agent comprises less than about 50 volume ppm water and/or hydrocarbon.

14. The system of claim 10, wherein the fuel supply component is connected with the regeneration component to facilitate contact between provide hydrogen and the regeneration component.

15. A hydrogen station comprising the system of claim 10.

16. The hydrogen station of claim 15, wherein the hydrogen station is a hydrogen filling station, or hydrogen home station.

17. A system that facilitates operating a proton exchange membrane fuel cell, comprising:
    a fuel supply component that supplies fuel to the proton exchange membrane fuel cell;
    a regeneration component that provides a reducing agent comprising a reducing plasma to a cathode catalyst of the proton exchange membrane fuel cell to reduce the cathode catalyst, wherein the reducing agent comprises at least one reducing gas species selected from a group consisting of a hydrogen containing plasma, a helium containing plasma, a neon containing plasma, an argon containing plasma, a nitrogen containing plasma, ammonia, amines, imines, and C1-C4 hydrocarbons; and
    a measuring device for measuring a quantity of hydrogen in the proton exchange membrane fuel cell.

18. The system of claim 17, wherein the regeneration component is an argon plasma generator.

19. The system of claim 17, wherein the reducing agent comprises an argon containing plasma.

20. The system of claim 17, wherein the fuel supply component is connected with the regeneration component to facilitate contact between hydrogen and the regeneration component.

* * * * *